United States Patent Office 3,441,116
Patented Apr. 29, 1969

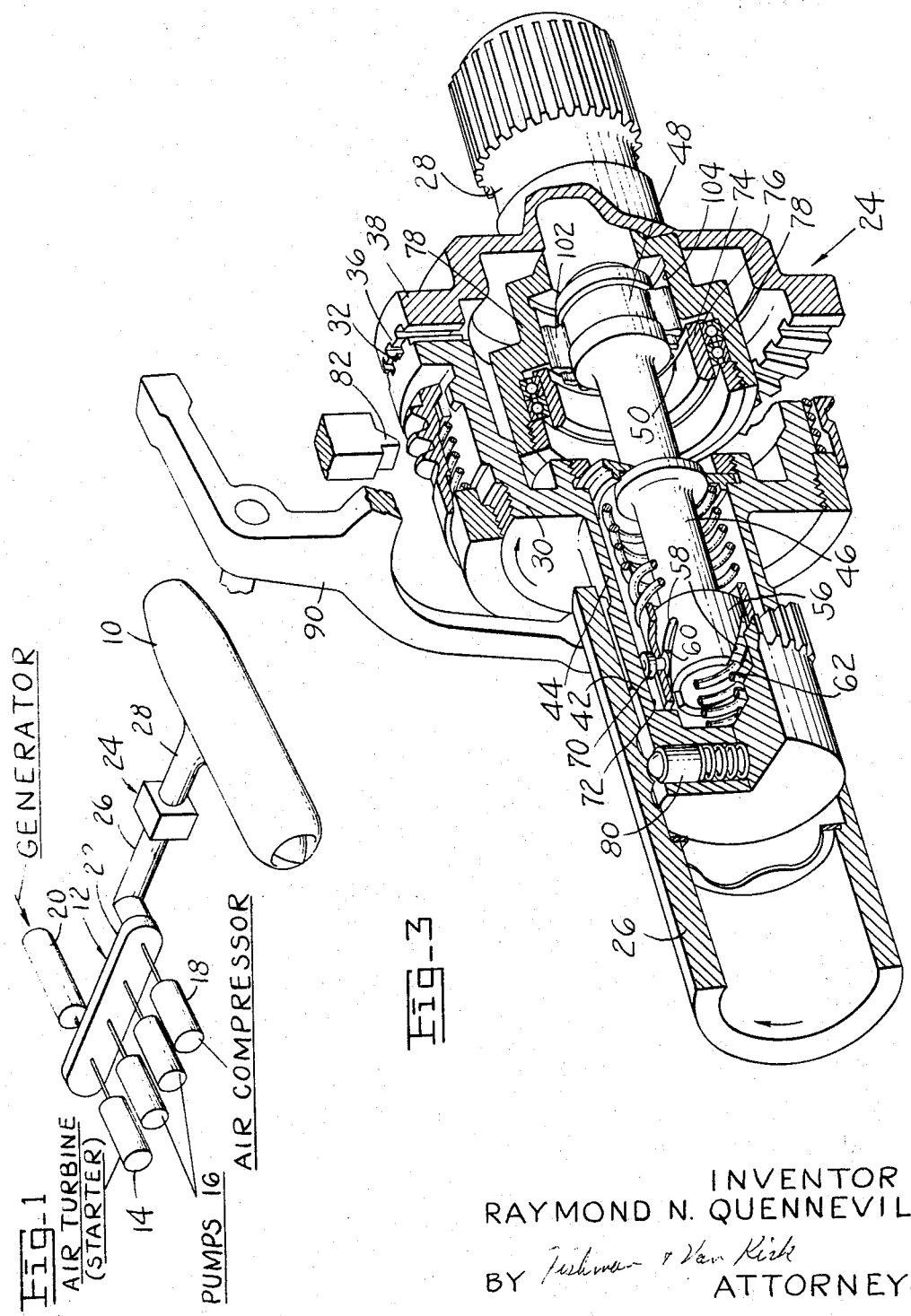

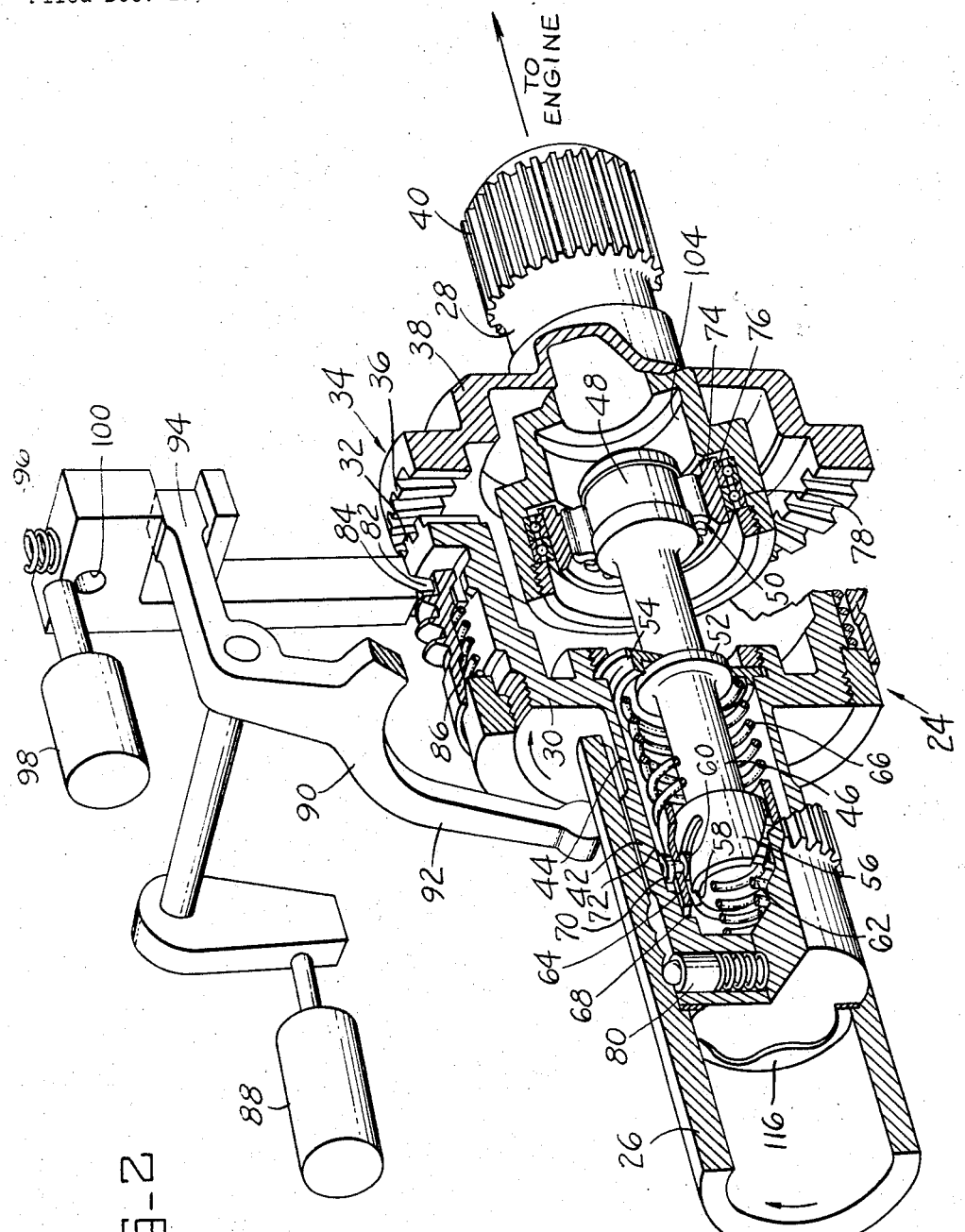

3,441,116
ELECTRICALLY OPERATED CLUTCH MECHANISM
Raymond N. Quenneville, Suffield, Conn., assignor to United Aircraft Corporation, East Hartford, Conn., a corporation of Delaware
Filed Dec. 13, 1966, Ser. No. 601,403
Int. Cl. F16d 11/04, 11/10, 13/22
U.S. Cl. 192—67          16 Claims

ABSTRACT OF THE DISCLOSURE

An electrically actuated mechanical clutch mechanism for connecting together two rotating members is disclosed. Either element may serve as the driving member and either element may serve as the driven member. A synchromesh feature, including a sprag clutch operable only when one element is rotating faster than the other element of the clutch, and a load absorbing spring arrangement, allows for actuation and engagement of the clutch elements while the parts are rotating. A decoupling mechanism incorporates a lost motion feature to insure proper engagement of the decoupling elements before any substantial decoupling load is encountered.

---

The invention described and claimed herein resulted from work done under U.S. Government Contract No. FA-SS-66-5; the U.S. Government has an irrevocable nonexclusive license under this application to practice and have practiced the invention claimed herein, including the unlimited right to sublicense others to practice and have practiced the claimed invention for any purpose whatsoever.

This invention relates to a coupling mechanism for connecting two rotating members. More particularly, this invention relates to a coupling mechanism for connecting two rotating elements wherein either of the rotating elements may be the driving element through the coupler and the other rotating element may be the element driven through the coupler.

The present invention is particularly suitable for use in the air turbine drive starter and auxiliary drive system of an aircraft gas turbine engine, and the invention will be discussed in that context. However, it will be clearly understood that the invention has general utility as a coupling mechanism, and that the environment of the gas turbine engine is discussed merely by way of illustration and not by way of limitation.

Heretofore, several significant deficiencies have been tolerated in the operation of the auxiliary components of a gas turbine engine (i.e. electrical generators, pumps, compressors and air conditioning equipment). These auxiliary components were directly connected to the engine, and could only be operated when the engine was running. Thus, hydraulic power, air conditioning, electrical power etc. were available only when the engine was running, unless supplied from a separate ground power cart.

Present requirements for advanced gas turbine engines dictate that the auxiliary components be contained in an auxiliary drive system separate from the engine and capable of being coupled to and uncoupled from the engine. However, the incorporation of prior art couplers would present several significant problems which must be overcome to make the use of a coupler practicable in the engine system. One of these problems is that in the event the engine is rotating when coupling is desired, it would be necessary with prior art couplers to wait for the engine to windmill down to a complete stop before attempting to recouple. An adequate synchromesh feature consistent with other requirements of the coupler has not heretofore been available to allow for reengaging the coupler while the engine was still windmilling. Another of these significant problems has been that a provision has not been available, consistent with other requirements of the coupling mechanism, to allow driving both ways through the coupler so that the air turbine drive starter could be engaged to start the engine and the engine then used to power the auxiliary drive system, and also allowing disengagement of the coupler so that the air turbine drive starter could be used to power just the auxiliary drive system. Still another significant problem of prior coupling mechanisms has been the occurrence of high torque loads because of relative motion between the coupling members during coupling activity. These problems discussed above and other shortcomings of prior coupling mechanisms are overcome and eliminated by the coupling mechanism of the present invention.

The coupler of this invention is an electrically actuated mechanical clutch assembly which contains a synchromesh feature to allow recoupling of the engine and the auxiliary drive system at any engine speed up to the maximum rotational speed of the engine air turbine drive (starter) on the auxiliary drive system side of the coupler. The coupling mechanism contains a sprag clutch which is driven into engagement with an engine drive member when the coupling mechanism is actuated, and at the same time the mating teeth of a jaw clutch are driven to a position just short of engagement. The sprag clutch is driven from the auxiliary drive system, and drives the engine drive element only when the sprag clutch rotates faster than the engine. The fact that the sprag drives the engine only when rotating faster than the engine allows the coupling mechanism to be engaged while the engine is still rotating. When the sprag elements engage the engine drive element, a force transmitting element is actuated by the sprag clutch to move the teeth of the jaw clutch into engagement. The force transmitting mechanism is connected through a spring arrangement to the jaw clutch to provide a synchromeshing feature and thus eliminate any overload problem if the teeth of the jaw clutch should first come together at a tooth-on-tooth position. The spring assembly is compressed to absorb the force transmitted through the force transmission element until the elements of the jaw clutch have rotated to a mating position, and the compressed spring assembly then drives the jaw clutch elements to the engaged position. The spring assembly also limits the amount of torque applied to the sprag elements and insures that the drive torque will be transmitted through the jaw clutch rather than through the sprag clutch.

Decoupling is accomplished through the use of a pawl which is brought into engagement with a threaded section on the outer surface of the jaw clutch. The rotating jaw clutch reacts with the pawl to accomplish a swift disengagement of the coupling mechanism. A lost motion feature is incorporated to allow for slight disengaging movement of the jaw before any significant load is encountered to insure proper engagement of the pawl with the threads before decoupling is initiated.

Since driving action through the coupling mechanism can be transmitted either from the starter of the auxiliary drive system to the engine or from the engine to the auxiliary drive system, the coupling mechanism serves both to provide starting power to the engine and as a power takeoff for driving the electrical generators, pumps, compressors and air conditioning equipment of the auxiliary drive system. In addition, upon disengagement of the coupling mechanism, the engine air turbine drive (starter) can be used as a direct drive for the components of the auxiliary drive system without starting the engine. Thus, a system such as an aircraft air conditioning system can be operated without starting the engines.

Another significant feature is that the present invention enables decoupling of the engine from a malfunctioning auxiliary component without having to shut down the engine. Heretofore, the only way a malfunctioning auxiliary component e.g. an overheating pump could be shut down was to shut down the engine.

Accordingly, one object of the present invention is to provide a novel coupling mechanism.

Another object of the present invention is to provide a novel coupling mechanism particularly suitable for use with gas turbine engines.

Still another object of the present invention is to provide a novel coupling mechanism between two rotating elements in which either element can be employed as the driving element to drive through the coupling mechanism to the other element.

Still another object of the present invention is to provide a novel coupling mechanism through which driving action can be transmitted in two different directions and which incorporates a synchromesh feature.

Still another object of the present invention is to provide a novel coupling mechanism in which coupling can be accomplished between a moving element and a stationary element or between two moving elements.

Still another object of the present invention is to provide a novel coupling mechanism in which coupling can be accomplished between two rotating elements only when the speed of a designated one of the elements exceeds the speed of the other element.

Still another object of the present invention is to provide a novel coupling mechanism especially suitable for use in an aircraft gas turbine engine installation wherein the coupling mechanism acts to transmit starter output to the engine and acts as a power takeoff from the engine to auxiliary systems, and wherein the coupling mechanism can be disengaged to allow the starter to drive the auxiliary systems.

Still another object of the present invention is to provide a coupling mechanism for aircraft gas turbine engines wherein the auxiliary system components can be decoupled in the event of a malfunction therein, while the engine remains operating.

Other objects and advantages will be apparent from the following detailed description and drawings.

In the drawings, wherein like elements are numbered alike in the several figures:

FIGURE 1 is a schematic showing of the coupling mechanism of the present invention located between the auxiliary drive system and the engine of a gas turbine engine installation.

FIGURE 2 is an elevation view, partly in section, of the coupling mechanism in the fully disengaged position.

FIGURE 3 is a view similar to FIGURE 2 showing the coupling mechanism at an intermediate stage of coupling.

Figure 4:
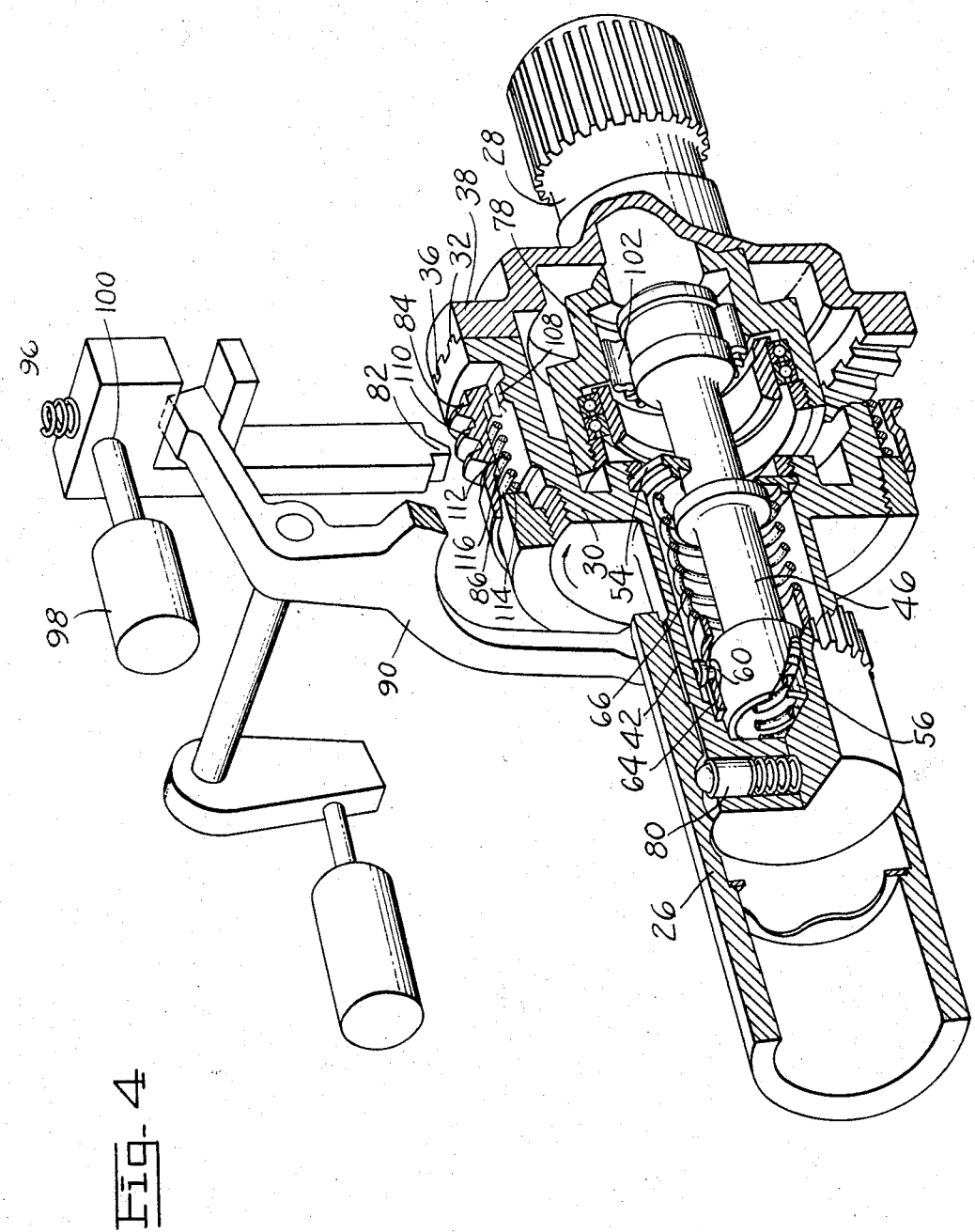
FIGURE 4 is a view similar to FIGURES 2 and 3 showing the coupling mechanism in the fully engaged position.

Referring now to FIGURE 1, an aircraft gas turbine engine 10 is shown with an auxiliary drive system 12. Auxiliary drive system 12 includes air turbine drive starter 14, hydraulic pumps 16, air compressor 18 such as for an air conditioning system, and electrical generator 20. A common gear train within housing 22 is connected to pumps 16, air compressor 18 and generator 20 to drive these elements of the auxiliary drive system either from starter 14 which may be connected to the common gear train or from engine 10 which may also be connected to the common gear train. The connection between the common gear train and housing 22 and engine 10 is accomplished through coupling mechanism 24 located between auxiliary drive system 12 and engine 10. The auxiliary drive system side of coupling mechanism 24 receives shaft 26 which is connected to and can be considered to be a part of the common gear train of auxiliary drive system 12; the engine side of coupling mechanism 24 receives engine drive shaft element 28 which is connected to the main rotating machinery structure of gas turbine engine 10.

As has been discussed generally above, coupling mechanism 24 can be engaged to allow starter 14 to drive through shaft 26 and through the coupling mechanism to engine 10 via engine drive shaft element 28; conversely, coupling mechanism 24 also allows power to be supplied from the engine via engine drive shaft element 28 through coupling mechanism 24 and via shaft 26 to the common gear train of the auxiliary drive system to power the auxiliary drive system elements during engine operation when starter 14 is disengaged. Also, coupling mechanism 24 can be disengaged and starter 14 can be connected to the common gear train of auxiliary drive system 12 so that starter 14 can be used to operate the auxiliary drive system elements when engine 10 is not running.

Referring now to FIGURE 2, the details of coupling mechanism 24 are shown with the coupling mechanism being in the fully disengaged position. A jaw clutch segment 30 on the auxiliary drive system side has one set of teeth 32 in an annular array forming part of a jaw clutch 34. The other set of teeth 36 of jaw clutch 34 are located in an annular array around clutch segment 38 formed on the end of engine drive shaft element 28. Engine drive shaft element 28 has a spline section 40 for connection to engine 10.

Auxiliary drive system shaft 26 is hollow and is connected through a spline 42 on its internal surface to a shaft 44 extending from jaw clutch segment 30. The spline connection between auxiliary drive system shaft 26 and shaft 44 causes shaft 44, and hence jaw clutch segment 30, to rotate with shaft 26 while allowing shaft 44 and jaw clutch segment 30 freedom to translate relative to shaft 26.

Shaft 44 also has a hollow section in which is located another shaft 46. One end of shaft 46 forms the inner race 48 of a unidirectional motion transmitting sprag clutch 50. An intermediate shoulder 52 on shaft 46 abuts against a plate 54 secured to jaw clutch segment 30. The other end of shaft 46 has a slotted sleeve 56 thereon, sleeve 56 being hollow and of larger diameter than shaft 46, and sleeve 56 preferably having three slots 58 in each of which is located a wheel or roller 60. The wheels 60 and slots 58 serve a motion transmitting purpose, and there are preferably three such wheels and slots located 120° apart for purposes of stability although only one wheel is shown in a slot for the sake of clarity in the figure. A spring 62 extends from an inner end surface of shaft 44 to a shoulder on shaft 46 within sleeve 56 to urge shaft 46 to the right to hold shoulder 52 against plate 54. Therefore, rightward movement of jaw clutch segment 30 will cause rightward movement of shaft 46.

Another sleeve 64 surrounds sleeve 56, and sleeve 64 houses the shafts on which the wheels 60 are rotatably mounted. A spring 66 extends from one end of sleeve 64 to plate 54 to allow sleeve 64 to translate relative to sleeve 56 along the axis of shaft 46, and the left end of sleeve 64 butts against a shoulder 68 on shaft 44. A number of wheels 70 corresponding to the number of wheels 60 are also rotatably mounted on the shafts held in sleeve 64, and the wheels 70 are located in axial slots or grooves 72 in shaft 44. The slots 58 in sleeve 56 are angled with respect to the slots 72 so that rotational movement of shaft 46 and sleeve 56 relative to sleeve 64 results in axial translation of sleeve 64.

Still referring to FIGURE 2, and returning now to a consideration of sprag clutch 50, an outer sprag ring 74 of the sprag clutch is located for free turning at the inner race 76 of a ball bearing so that the sprag clutch merely rides freely when the coupling mechanism is in the disengaged position as shown in FIGURE 2. The ball bearing is retained in a housing 78 which is threadably connected to engine drive shaft 28 and jaw clutch segment 38 so that housing 78 can be considered to be an integral part of engine drive shaft element 28.

When the coupling mechanism is in the uncoupled condition as shown in FIGURE 2, a detent 80 is positioned in the leftmost of three recesses in shaft 26 to prevent drifting, and a pawl 82 is located in an annular groove 84 in a decoupling ring 86 to also prevent rightward movement of jaw clutch segment 30.

When it is desired to actuate the coupling mechanism, a solenoid 88 is activated to rotate yoke 90 in a counterclockwise direction. The legs 92 (only one of which is fully shown in FIGURE 2) are in contact with jaw clutch segment 30, and the counterclockwise rotation of yoke 90 cause the legs 92 to urge jaw clutch segment 30 to the right. The counterclockwise rotation of yoke 90 is also transmitted through arm 94 to raise pawl 82 upward to compress a spring 96 and cause the plunger of a solenoid 98 to engage a recess 100 to lock the pawl in a retracted position.

Referring now to FIGURE 3, coupling mechanism 24 is shown in an intermediate position on the way to the coupled position after the actuating signal has been delivered to solenoid 88. It will be noted that yoke 90 has been rotated counterclockwise and that pawl 82 has been retracted. The counterclockwise rotation of yoke 90 moves jaw clutch segment 30 to the right to close the gap between teeth 32 and 36 to approximately 0.020″. Since shaft 44 extends from jaw clutch segment 30, shaft 44 is also moved to the right and the rightward movement of shaft 44 is transmitted through spring 62 to move shaft 46 to the right. The rightward movement of shaft 46 moves sprag clutch inner race 48 to the right, and inner race 48 carries with it the sprag elements 102 from ring 74 to a cylindrical opening 104 within housing 78. This movement of the sprag elements transfers the sprag clutch from a free running connection with bearing inner race 76 to a state where it is now capable of achieving a driving connection between shaft 46 and engine drive shaft 28 through housing 78. Detent 80 is now in the middle of the three recesses to prevent drifting, and the coupling mechanism is now ready to proceed to the final stage of coupling.

Solenoid 88 is then deenergized; and power is then supplied to starter 14, and starter 14 is engaged with auxiliary drive shaft 26 to accomplish the final stage of coupling. Starter 14 now drives shaft 26 (assume a clockwise rotation of shaft 26 for purposes of illustration), and the clockwise rotation of shaft 26 is transmitted through spline 42 to shaft 44, thence through wheel 70 in groove 72 to wheel 60, and thence to slotted sleeve 56 to turn shaft 46 clockwise. Sprag clutch 50 is designed so that the sprag elements 102 will not drivingly engage surface 104 of housing 78 until the speed of shaft 46, and hence the speed of race 48, matches the engine speed as reflected by the rotational speed of shaft 28 and housing 78. Of course, if the rotor elements of engine 10 are stationary, then the sprag elements lock to housing 78 immediately.

Referring now to FIGURE 4, the coupling mechanism is shown in its fully coupled position after the final transition has been accomplished from the stage shown in FIGURE 3. Upon the locking of the sprag elements 102 to housing 78, a momentary torque is imposed on shaft 46, and sleeve 64 is driven to the right by the interaction between wheels 60 and the slots in sleeve 56. This rightward motion of sleeve 64 is transmitted through spring 66 to plate 54 and then to jaw clutch segment 30 to move teeth 32 and 36 into complete engagement as shown. Detent 80 is then in the rightmost recess and full engagement of the coupling mechanism has been accomoplished.

Due to the nature of the jaw clutch, there is an equal chance that the jaw segments will come together tooth-on-tooth or tooth-on-space. The foregoing description of the final stage of engagement assumed that the jaw segments came together tooth-on-space so that the final engagement of the jaw segments took place as described. However, if jaw segment 30 contacts segment 38 with teeth opposing teeth, segment 30 cannot advance to the right to complete engagement without first rotating to the engaging position of tooth-on-space. If this tooth-on-tooth engagement occurs, sleeve 64 continues to advance to the right, and this advancing force is temporarily absorbed by a compression of spring 66 so that segment 30 is allowed to continue to rotate. When segment 30 is rotated to a position of tooth against space, the load of spring 66 against plate 54 causes jaw segment 30 to be moved to the right to complete the engagement between teeth 32 and teeth 36. The advancing of sleeve 64 also limits the amount of torque applied to sprag elements 102 and thus prevents overloading of the sprag elements.

The teeth 32 and 36 on each of the jaw segments are of trapezoidal shape with a negative rake on each side in order to provide an engaging force at all times, i.e. regardless of whether the direction of drive is from auxiliary drive shaft 26 to engine drive shaft element 28 or vice versa. When the jaw teeth engage, the force transmitted from starter 14 through shaft 26 is then transmitted through spline 42 to segment 30 and thence through the jaw teeth to engine drive shaft 28, thus bypassing the main load around sleeve 64 and shaft 46. As engine speed increases above that of the starter, the direction of drive through the coupling mechanism is reversed so that the drive is from engine drive shaft element 28 through the jaw teeth and through spline 42 to auxiliary drive shaft 26. This reversal of the drive direction transfers the torque on the jaw teeth from one side of the teeth to the other side of the teeth by the slight rotation resulting from tooth backlash. This slight rotation causes a rotation of housing 78 relative to the sprag elements 102, and this slight rotation tends to put the sprag cluch in an overrunning condition and thus unload shaft 46 from housing 78.

To accomplish decoupling, an actuating signal is delivered to energize solenoid 98 to withdraw the plunger from detent 100. Spring 96 then drives pawl 82 downward toward jaw clutch segment 30 while also causing yoke 90 to be rotated clockwise to its decoupled position shown in FIGURE 2 (it being borne in mind that solenoid 88 was previously deenergized at the time of engaging starter 14 so that solenoid 88 does not oppose the clockwise rotation of yoke 90). The downward motion of pawl 82 drives the pawl toward engagement with a decoupling ring 86 which is connected to jaw clutch segment 30 by spline 108 so that decoupling ring 86 rotates with jaw clutch segment 30. The outer surface of decoupling ring 86 has several turns of threads 110 leading to annular groove 84, and the downward travel of pawl 82 brings the pawl into engagement with threads 110.

The jaw clutch rotates clockwise regardless of the direction of drive through the clutch, and thus threads 110 are left handed so that rotation of the threads against the laterally stationary pawl 82 moves disengaging ring 86 leftward in a direction to disengage the jaw clutch segments. Of course, it will be understood that the thread would be reversed if the clutch elements rotated counterclockwise. In order to guarantee complete engagement between pawl 82 and threads 110 before any significant load is picked up, a spring 112 extends between ring 86 and a shoulder 114 on jaw clutch segment 30, and the initial leftward movement of decoupling ring 86 merely compresses spring 112 during the first revolution of ring 86 after engagement has been made with pawl 82. This initial leftward movement of ring 86 then brings shoulder 116 on ring 86 into contact with shoulder 114 so that ring 86 then picks up the load of jaw clutch segment 30. The continued leftward force generated by further rotation of ring 86 during engagement between pawl 82 and threads 110 then creates a force urging jaw clutch segment 30 leftward to pull jaw segment 30 and teeth 32 out of engagement with jaw clutch segment 38 and teeth 36. The leftward movement of decoupling ring 86 then brings pawl 82 into annular groove 84 so that jaw clutch segment 30 can continue to rotate without generaling a continual leftward force on decoupling ring 86.

Referring again to FIGURE 2, the leftward movement of jaw clutch segment 30 on decoupling causes plate 54 to transmit a leftwardly directed force to shoulder 52, and thus shaft 46 is moved to the left to pull sprag clutch 50 from cylindrical opening 104 back into engagement with sprag ring 74 as a part of the decoupling process. Shaft 44 also moves leftwardly on decoupling, and shaft 44 at the end of its movement strikes a buffer spring 116 housed within shaft 26 to absorb the energy in the leftward moving elements during decoupling. Solenoid 98 can then be deenergized, and the coupling mechanism is then ready for another coupling cycle.

Uncoupling can only occur when jaw clutch 34 is rotating. Approximately two revolutions of jaw clutch 34 are required to disengage teeth 32 from teeth 36, and the complete decoupling cycle can be accomplished in four revolutions of jaw clutch 34.

While a preferred embodiment has been shown and described, various modifications and substitutions may be made without departing from the spirit and scope of this invention. Accordingly, it is to be understood that this invention has been described by way of illustration rather than limitation.

What is claimed is:
1. A coupling mechanism for transmitting motion including:
   a first rotatable engaging member;
   a second rotatable engaging member in opposing relationship to said first engaging member;
   said first and second engaging members having a first position of disengagement with each other and a second position of engagement with each other, and said first and second engaging members being capable of relative movement to move between said first position and said second position;
   a first movable member connected to said first engaging member;
   a second movable member connected to said second engaging member;
   first unidirectional motion transmitting means extending from one of said first and second engaging members;
   engagement means on the other of said first and second engaging members for receiving said unidirectional motion transmitting means, said unidirectional motion transmitting means having a first position disengaged from said engagement means in said first position of said first and second engaging members and having a second position for engagement with said engagement means in said second position of said first and second engaging members;
   means for moving a selected one of said first and second engaging members from said first position to an intermediate position toward said second position to move said engaging members toward engagement and to place said unidirectional motion transmitting means in said second position thereof, said unidirectional motion transmitting means engaging said engaging means in response to a predetermined rotational speed relationship between said first and second engaging members;
   second motion transmitting means operatively connected between said first motion transmitting means and said selected one of said engaging members and being responsive to torque generated by engagement of said first motion transmitting means for moving said selected one of said engaging members from said intermediate position to said second position of said first and second engaging members to transmit motion from one of said first and second movable members to the other; and
   motion absorbing means connected between said second motion transmitting means and said selected one of said engaging members for temporarily absorbing motion of said second motion transmitting means in response to interference in moving said selected one of said engaging members from said intermediate position thereof to said second position thereof.

2. A coupling mechanism for transmitting motion as in claim 1 including:
   disengaging means for moving said selected one of said engaging members from said second position thereof to said first position thereof.

3. A coupling mechanism for transmitting motion as in claim 2 wherein said engagement means moves to said first disengaged position thereof upon movement of said selected one of said engaging members to said first position thereof by said disengaging means.

4. A coupling mechanism for transmitting motion as in claim 2 wherein said disengaging means includes lost motion means.

5. A coupling mechanism for transmitting motion as in claim 1 wherein said first and second engaging members are first and second mating elements of a jaw clutch.

6. A coupling mechanism for transmitting motion as in claim 5 wherein said elements of said jaw clutch have negative rake teeth.

7. A coupling mechanism for transmitting motion as in claim 1 including means for allowing said first unidirectional motion transmitting means to move freely in said first disengaged position thereof.

8. A coupling mechanism for transmitting motion as in claim 1 wherein said first unidirectional motion transmitting means includes sprag clutch means.

9. A coupling mechanism for transmitting motion including:
   a first rotatable engaging member;
   a second rotatable engaging member in opposing relationship to said first engaging mmeber;
   said first engaging member having a first position of disengagement with said second engaging member and a second position of engagement with said second engaging member, and said first engaging member being capable of movement relative to said second engaging member to move between said first and second positions of said first engaging member;
   a first rotatable member connected to said first engaging member;
   a second rotatable member connected to said second engaging member;
   first unidirectional motion transmitting means extending from said first engaging member;
   engagement means on said second engaging member for receiving said unidirectional motion transmitting means, said unidirectional motion transmitting means having a first position disengaged from said engagement means corresponding to said first position of said first engaging member and having a second position for engagement with said second engaging means corresponding to said second position of said first engaging member;
   means for moving said first engaging member from said first position thereof to an intermediate position toward said second position thereof to move said engaging members toward engagement and to place said unidirectional motion transmitting means in said second position thereof, said unidirectional motion transmitting means engaging said engaging means in response to a predetermined difference in rotational speed between said first and second engaging members;
   second motion transmitting means operatively connected between said first motion transmitting means and said first engaging member and being responsive to torque generated by engagement of said first unidirectional motion transmitting means for moving said first engaging member from said intermediate position thereof to said second position thereof to transmit motion from one of said first and second rotatable members to the other; and motion absorbing means connected between said second motion transmitting means and said first engaging member for temporarily absorbing motion of said second motion transmitting means in response to interference between said first and second engaging members in moving said first engaging member from said intermediate position thereof to said second position thereof.

10. A coupling mechanism for transmitting motion as in claim 9 including:
disengaging means for moving said first engaging member from said second position thereof to said first poistion thereof.

11. A coupling mechanism for transmitting motion as in claim 10 wherein said engagement means moves to said first disengaged position thereof upon movement of said first engaging member to said first position thereof by said disengaging means.

12. A coupling mechanism for transmitting motion as in claim 9 wherein said disengaging means is connected to said first engaging member for rotation and is capable of translation relative to said first engaging member, and wherein said disengaging means includes lost motion means operable during translation of said disengaging means relative to said first engaging member.

13. A coupling mechanism for transmitting motion as in claim 9 wherein said first and second engaging members are first and second mating elements of a jaw clutch.

14. A coupling mechanism for transmitting motion as in claim 13 wherein said elements of said jaw clutch have negative rake teeth.

15. A coupling mechanism for transmitting motion as in claim 9 wherein said first unidirectional motion transmitting means includes sprag clutch means.

16. A coupling mechanism for transmitting motion as in claim 15 wherein said sprag clutch means is housed in antifriction means for free rotation in said first disengaged position of said first unidirectional motion transmitting means.

References Cited
UNITED STATES PATENTS

| | | | |
|---|---|---|---|
| 1,515,100 | 11/1924 | Foster | 192—108 |
| 2,642,970 | 6/1953 | Szekely | 192—24 |
| 2,721,482 | 10/1955 | Shank et al. | |
| 2,755,678 | 7/1956 | Mac Donald | 192—24 |
| 3,191,732 | 6/1965 | McDowall. | |
| 3,203,526 | 8/1965 | Clements. | |
| 3,279,273 | 10/1966 | Clements et al. | |
| 3,272,295 | 9/1966 | Clements. | |

BENJAMIN W. WYCHE III, *Primary Examiner.*

LESLIE J. PAYNE, *Assistant Examiner.*

U.S. Cl. X.R.

192—48.2, 48.6, 63, 24, 47